2,987,386
PRODUCTION OF CARBON MONOXIDE AND HYDROGEN

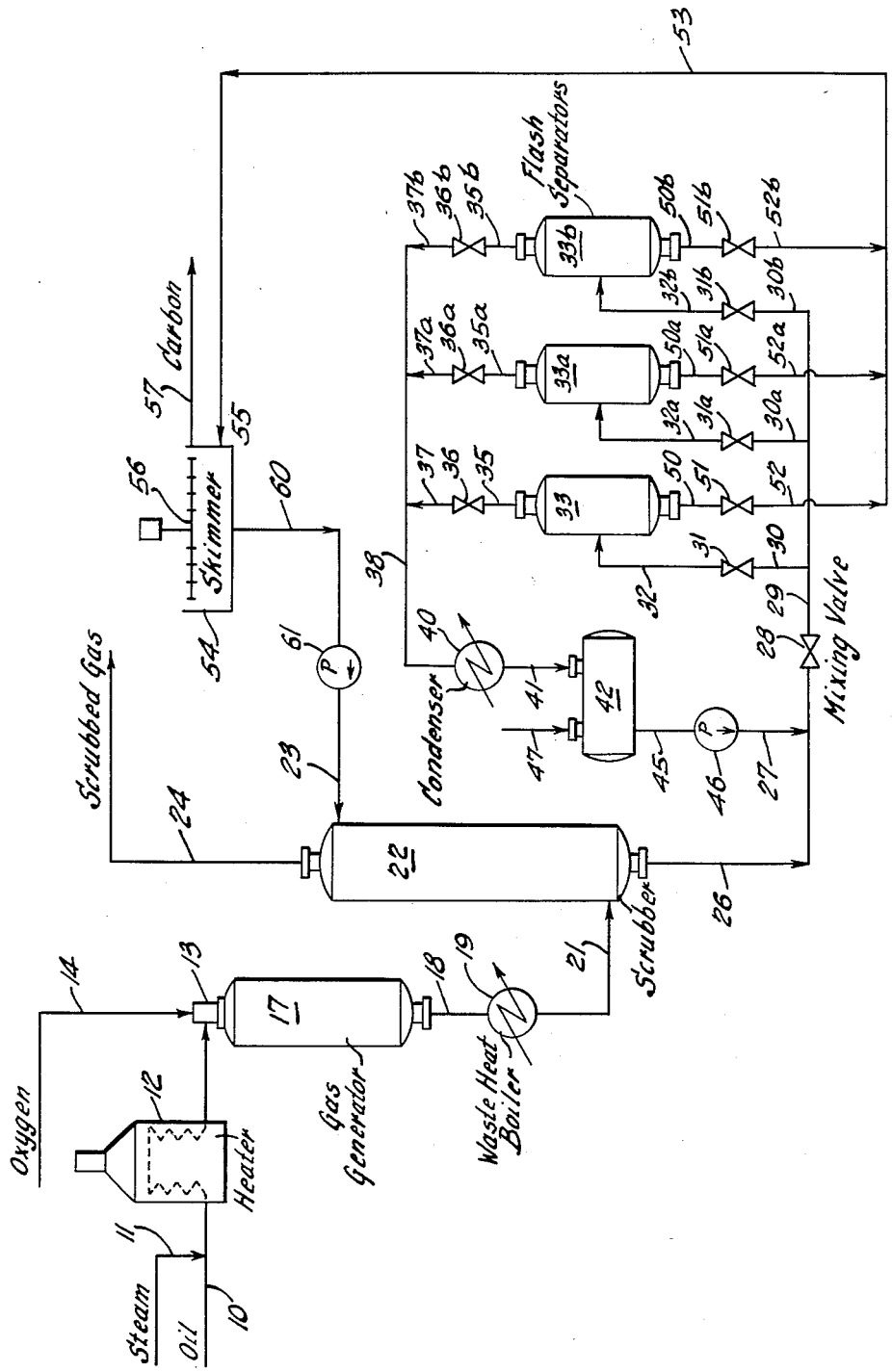

Ronald W. Chapman, Whittier, John C. Ahlborn, Monterey Park, and Roger M. Dille, Whittier, Calif., assignors to Texaco Inc., a corporation of Delaware
Filed May 29, 1958, Ser. No. 738,844
10 Claims. (Cl. 48—196)

This invention relates to a process for the production of carbon monoxide and hydrogen from fossil fuels by reaction with oxygen. In one of its more specific aspects it is directed to a method of separating carbonaceous solid entrained in the gaseous products of reaction of fossil fuels and oxygen wherein said products are scrubbed with water, scrubbing water containing dispersed carbonaceous solid is contacted with a liquid hydrocarbon effecting coalescence of the carbonaceous solid and clarification of the water, said hydrocarbon is vaporized effecting separation of hydrocarbon from said carbonaceous solid, and said carbonaceous solid is skimmed from said clarified water.

The generation of carbon monoxide and hydrogen by the partial oxidation of fossil fuels is a highly economic method of producing these gases. In the partial oxidation process, a fossil fuel, for example, coal, petroleum oil, or natural gas, is reacted with an oxygen-containing gas in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and relatively small amounts of water vapor, carbon dioxide, and entrained carbonaceous solid. The carbonaceous solid is in the form of very fine carbon particles, and upon separation is useful as carbon black.

The amount of uncombined oxygen supplied to the reaction zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of this purity is generally preferred.

Product gases issuing from the gas generation step contain a large amount of sensible heat. This heat may be employed to convert water to steam. If the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases in indirect heat exchange through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon is effectively removed from the product gases by contacting the cooled synthesis gas with water in gas-liquid contact apparatus, for example, spray towers, bubble towers, baffle towers or packed towers. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 1 percent. However, efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding carbon separating steps, and delivers the product gas for use with a minimum of compression.

The dispersion of solid carbon in water withdrawn from the scrubbing zone is contacted with oil to effect coalescence of the carbonaceous solid and clarification of the water. The clarified water layer may contain some residual solids or may be clear. It is to be understood that the term "clarified" as used herein is to be construed in its broadest sense to refer to water of reduced solids content. The carbon produced in the partial oxidation of fossil fuels appears to contain some chemisorbed oxygen and is easily wet by the scrubbing water. However, the carbon is preferentially wet by hydrocarbons and upon contact with hydrocarbon, the oil wet carbon particles become hydrophobic and the dispersion is broken. After the dispersion has been broken, the hydrocarbon may be separated from the carbon particles without reforming of the dispersion. It appears that wetting the carbon with water and then with a liquid hydrocarbon substantially increases the hydrophobic quality of the carbon even after removal of the hydrocarbon. Considerable agitation is required for formation of the dispersion and so the carbon may be skimmed from the surface of the water in a quiescent separator. Any remaining tendency toward redispersion resulting from turbulence incidental to the transfer of the materials through the separating equipment may be effectively counteracted by leaving a small portion of hydrocarbon on the carbon particles. This may be effected by vaporizing only a part of the vaporizable hydrocarbon or by employing a mixture comprising a small amount of unvaporizable hydrocarbon with a vaporizable hydrocarbon, for example, a mixture of a liquid hydrocarbon boiling substantially above the boiling point of water with a liquid hydrocarbon boiling below the boiling point of water.

Hydrocarbons suitable in the process of this invention include those which are liquid at the pressure and temperature of the contacting zone and which may be vaporized by the sensible heat of the hydrocarbon, carbon and water upon the release of pressure. Suitable vaporizable hydrocarbons, for example, include butanes, pentanes, hexanes, benzol, toluol, natural gasoline, gasoline, naphtha, their mixtures and the like. A small amount of heavy oil, for example, gas oil, residual oil or fuel oil which are not vaporized under the separating conditions employed, may be admixed with the vaporizable hydrocarbons.

The water dispersion is contacted with an amount of hydrocarbon at least equal to one half of the oil absorption value of the carbon. Oil absorption value is a criterion of the amount of oil necessary to wet a particular sample of carbon. The oil absorption value is determined by adding increments of alkali-refined linseed oil to a 1.00 gram sample of carbon, and mixing with a spatula between each additional until a single coherent ball of paste is formed which does not break down after forming. The procedure for this test is described in detail in ASTM test D281–31. The oil absorption value is expressed as cubic centimeters per gram. Oil absorption value may be expressed in cubic centimeters per gram or may be converted to units of gallons per hundred pounds by applying a factor of 12. The oil absorption value of carbon produced in the partial oxidation of fossil fuels typically varies within the range of about 0.2 to 5.0 cubic centimeters per gram, equivalent to about 2.4 to 60 gallons per hundred pounds. An amount of hydrocarbon equal to the oil absorption value is preferred for rapid resolution of the dispersion into undispersed carbon and clarified water. Contacting of the liquid hydrocarbon and water dispersion may be effected with a mixing valve, pump, orifice, nozzle, propeller mixer, or turbine mixer. It is preferred to contact the oil and water dispersion at about the temperature and pressure of the scrubbing zone. Higher pressure makes possible the use of lower boiling hydrocarbon oils. High temperature facilitates phase separation by reducing oil viscosity.

The clarified water and floating carbon are then passed into a vaporization zone where the hydrocarbon is vaporized and separated from the carbon and water. Vaporization of the hydrocarbon may be effected upon reduction of pressure. Heat of vaporization of the hydrocarbon is derived from the sensible heat of the hydrocarbon, carbon and water. Because of the large amount of heat available in the water, relatively little drop in temperature occurs upon reduction of pressure. For example, the hydrocarbon required to resolve a carbon-water dispersion may comprise about 4 weight percent of the mixture and the sensible heat available upon cooling the mixture about 5° F. may provide the latent heat of vaporization since about 97 percent of the heat is supplied by sensible heat of the water.

Vaporized hydrocarbon is withdrawn, condensed and returned for further use in contacting additional carbon-water dispersion. After removal of the hydrocarbon, the clarified water and floating carbon are easily separated by skimming the carbon from the top of the water, for example, by conventional flotation separation methods. The separated carbon is dried and packaged. Clarified water is withdrawn and returned to the scrubbing zone for the removal of additional carbon.

When ash-containing fossil fuels, for example, coal, are used for the production of carbon monoxide and hydrogen, it is generally desirable to separate at least a part of the ash from the reaction products. Removal of the ash increases the utility and value of the carbon which is separately recovered and facilitates the clarification of the carbon-containing scrubbing water. A large part of the ash is easily removed in a quench zone wherein the products are cooled by direct contact with water and the molten ash converted to a sand-like solid slag which settles to the bottom of the quench zone and may be withdrawn through lock hoppers. The quenched gas containing entrained carbon and fine slag is then contacted with water in a scrubbing zone to effect removal of substantially all of the solids from the gas forming a dispersion of solid in the scrubbing water. The scrubbing water dispersion is then passed to one or more settlers where the relatively coarse and dense slag particles are settled and the water containing dispersed carbon particles is withdrawn. The carbon-water dispersion is then contacted with oil as described above to effect clarification of the water and separation of carbon.

An advantage of the process of this invention is that carbon is effectively and efficiently removed from synthesis gas.

Another advantage of the process of this invention is that the carbon formed in the manufacture of synthesis gas is separated as a dry solid suitable for use as carbon black.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described.

Oil in line 10 is admixed with steam from line 11 and the mixture passed through heater 12 to gas generator burner 13. Oxygen in line 14 is admixed with the steam-oil mixture in burner 13. The steam, oil and oxygen react in gas generator 17 at an autogenous temperature of about 2800° F. and 300 pounds per square inch gauge to produce a synthesis gas comprising carbon monoxide and hydrogen. Additionally, the synthesis gas contains entrained carbon amounting to about 2 percent of the carbon content of the oil feed. Hot synthesis gas from gas generator 17 is withdrawn through line 18 and passed to waste heat boiler 19 where the synthesis gas is cooled by the generation of steam. The cooled synthesis gas is passed through line 21 to scrubber 22 where the synthesis gas and entrained carbon is contacted in countercurrent flow with scrubbing water introduced through line 23. Synthesis gas substantially free of entrained carbon is withdrawn through line 24 and discharged for utilization not shown.

Scrubbing water comprising about 1 percent dispersed carbon is withdrawn from scrubber 22 through line 26 at a temperature of about 270° F. The scrubbing water-carbon dispersion is contacted with natural gasoline from line 27 and the combined stream passed through mixing valve 28. A pressure drop of about 30 pounds per square inch across mixing valve 28 effects high turbulence and mixing of the water, carbon, and natural gasoline. The mixture then passes through lines 29, 30, valve 31 and line 32 to flash separator 33.

In one embodiment of the process of this invention, valve 31 is throttled so that the natural gasoline is flashed to vapor in passing therethrough and the effluent discharged into flash separator 33. In separator 33, velocities are low and vapor and carbon with entrapped vapor floats to the surface of the water. Natural gasoline vapor, separated from the clarified water and floating carbon, is withdrawn from the top of flash separator 33 and passed through line 35, valve 36, and lines 37 and 38 to condenser 40. The natural gasoline vapors are cooled and condensed to liquid in condenser 40, and passed through line 41 to accumulator drum 42. Liquid natural gasoline is withdrawn from accumulator drum 42 through line 45 and passed through line 27 by pump 46 into contact with additional water-carbon dispersion. Make-up natural gasoline is supplied through line 47 to compensate for any losses or consumption.

Clarified water and floating carbon in flash separator 33 is withdrawn through line 50, valve 51 and lines 52 and 53 for transfer to skimmer 54. Skimmer 54 comprises a tank 55 provided with a rotating rake 56 which skims floating carbon from the top of clarified water. Carbon raked off the top of skimmer 54 is discharged through line 57 to drying and packaging facilities not shown. Clarified water is withdrawn from skimmer 54 through line 60 and is passed by pump 61 through line 23 to scrubber 22.

In another embodiment of the process of this invention, a plurality of flash separators are employed and the mixture of water, carbon, and hydrocarbon is introduced into the flash separator before pressure is released. Illustrative of this method of processing, while one flash separator is being filled, another of the flash separators is depressured to effect flash vaporization of the hydrocarbon, and the third flash separator is emptied to the skimmer. Upon filling, of one separator, the transfer lines are switched so that the filled separator is advanced to the depressuring step, and the flashed separator is then emptied, and flow of the water-carbon-hydrocarbon mixture is directed to the empty separator. Flash separator 33 is filled while valve 31 is open and valves 36 and 51 are closed. Simultaneously hydrocarbon vapor is flashed out of separator 33a by opening valve 36a while valves 31a and 51a are closed. Separator 33b is emptied by opening valve 51b while valves 31b and 36b are closed. Each separator is advanced to the next part of the cycle by operation of the corresponding lettered valves.

*Example*

Synthesis gas is produced by the partial oxidation of a bunker fuel oil at a temperature of 2600° F. and at 250 pounds per square inch gauge. In the generation of the synthesis gas, 2 percent of the carbon content of the fuel oil is unconverted to gaseous products and appears as entrained carbon in the product gas. The entrained carbon has an oil absorption value of 32 gallons per hundred pounds. The hot synthesis gas is cooled to 400° F. and steam is generated by passing the synthesis gas through a waste heat boiler. The cooled gas is scrubbed with water in a scrubber maintained at 248 pounds per square inch gauge. Scrubbing water containing 1 percent entrained carbon is withdrawn at a temperature of 265° F. The scrubbing water is contacted with liquid benzol at a combined temperature of 261° F. and at a rate of 30 gallons per hundred pounds of entrained carbon. The mixture of scrubbing water, carbon, and benzol is thoroughly mixed by passing through a valve which discharges to a separating zone maintained at 5 pounds per square inch gauge. The benzol is vaporized and the temperature of the clarified water, floating carbon and benzol vapor drops to 228° F. The benzol vapor and steam are condensed and the benzol is recycled for further use. The carbon in the form of a light, fluffy, dry appearing solid is skimmed off the top of the clarified water and the clarified water is returned to the scrubbing zone.

Obviously many modifications and variations of the invention, as hereinbefore set forth, may be made without departing from the spirit and scope thereof and only such limitations should be imposed as are indicated in the appended claims.

We claim:

1. A method for recovering carbonaceous solid from a gas stream resulting from reaction of carbonaceous fuel with oxygen in a reaction zone to produce a product gas stream comprising carbon monoxide, hydrogen and entrained carbonaceous solid, which comprises contacting said product gas stream with water in a gas scrubbing zone effecting removal of carbonaceous solid from said gas stream forming a dispersion of solid in water, contacting said dispersion with a volatile liquid hydrocarbon in a mixing zone effecting resolution of said dispersion into clarified water and floating hydrocarbon-wet solid, vaporizing hydrocarbon from said hydrocarbon-wet solid in the presence of said water leaving undispersed solid floating in said clarified water, and separately withdrawing said undispersed solid and clarified water.

2. A method for recovering carbonaceous solid from a gas stream resulting from reaction of carbonaceous fuel with oxygen in an unpacked reaction zone at an autogenous temperature within the range of about 1800 to 3500° F. and at a pressure within the range of about 100 to about 600 pounds per square inch gauge producing a hot gas stream comprising hydrogen, carbon monoxide, water vapor, and entrained carbonaceous solid having an oil absorption value within the range of about 2.4 to 60 gallons per hundred pounds, which comprises partially cooling said hot gas stream by indirect heat exchange to a temperature above its dew point, contacting the partially cooled gas stream with water in a scrubbing zone effecting separation of carbonaceous solid therefrom forming a dispersion comprising not more than about 1.0 weight percent carbonaceous solid, contacting said dispersion with a volatile liquid hydrocarbon at a rate of at least one half of the oil absorption value of said carbonaceous solid effecting resolution of said dispersion into clarified water and floating hydrocarbon-wet solid, vaporizing hydrocarbon from said hydrocarbon-wet solid in the presence of said water leaving said solid undispersed in said clarified water, and separately withdrawing said solid and said clarified water.

3. The process of claim 1 wherein said liquid hydrocarbon comprises a hydrocarbon boiling below the boiling point of water.

4. The process of claim 2 wherein said liquid hydocarbon comprises a mixture of a liquid hydrocarbon boiling below the boiling point of water and a liquid hydrocarbon boiling substantially above the boiling point of water.

5. The process of claim 1 wherein said separated hydrocarbon vapor is condensed and recycled in contact with said carbon-water dispersion.

6. The process of claim 1 wherein said clarified water is recycled to said scrubbing zone effecting separation of carbonaceous solid from said partially cooled gas stream.

7. A method for recovering carbonaceous solid from a gas stream resulting from reaction of carbonaceous fuel with oxygen in a reaction zone to produce a product gas stream comprising carbon monoxide, hydrogen and entrained carbonaceous solid, which comprises contacting said product gas stream with water in a gas scrubbing zone effecting removal of carbonaceous solid from said gas stream forming a dispersion of solid in water, contacting said dispersion with a volatile liquid hydrocarbon in a mixing zone effecting resolution of said dispersion into clarified water and floating hydrocarbon-wet solid, passing said hydrocarbon-wet solid and clarified water into a vaporization zone at a pressure less than the pressure of said mixing zone and at a temperature above the boiling point of said liquid hydrocarbon at the prevailing pressure effecting vaporization of hydrocarbon from said hydrocarbon-wet solid in the presence of said water leaving undispersed solid floating in said clarified water, and separately withdrawing said undispersed solid and clarified water.

8. A method for recovering carbonaceous solid from a gas stream resulting from reaction of carbonaceous fuel with oxygen in a reaction zone to produce a product gas stream comprising carbon monoxide, hydrogen and entrained carbonaceous solid having an oil absorption value of about 32 gallons per hundred pounds, which comprises contacting said product gas stream with water in a gas scrubbing zone effecting removal of carbonaceous solid from said gas stream forming a dispersion of solid in water, contacting said dispersion with benzol at a rate of about 30 gallons per hundred pounds in a mixing zone effecting resolution of said dispersion into clarified water and floaitng benzol-wet solid, flash vaporizing said benzol from said benzol-wet solid in the presence of said clarified water leaving undispersed dry appearing solid floating in said clarified water, and separately withdrawing said undispersed solid and clarified water.

9. The process of claim 1 wherein said liquid hydrocarbon is benzol.

10. A method for recovering carbonaceous solid from a dispersion of carbonaceous solid in water which comprises contacting said dispersion with a volatile liquid hydrocarbon effecting resolution of said dispersion into clarified water and floating hydrocarbon-wet carbonaceous solid, vaporizing said volatile hydrocarbon from said hydrocarbon-wet carbonaceous solid in the presence of said water leaving undispersed carbonaceous solid floating on said clarified water, and separately withdrawing said undispersed carbonaceous solid and clarified water.

References Cited in the file of this patent

UNITED STATES PATENTS

| | | |
|---|---|---|
| Re. 22,454 | Weigand | Mar. 7, 1944 |
| 736,381 | Gloyner | Aug. 18, 1903 |
| 1,955,065 | Hawley | Apr. 17, 1934 |
| 2,226,532 | Hawley | Dec. 31, 1940 |
| 2,587,107 | Cade | Feb. 26, 1952 |
| 2,665,980 | Carkeek | Jan. 12, 1954 |
| 2,677,439 | Hedberg | May 4, 1954 |
| 2,746,564 | Williams | May 22, 1956 |
| 2,781,246 | Goldtrap | Feb. 12, 1957 |
| 2,793,938 | Frank | May 28, 1957 |

OTHER REFERENCES

Convertal Process of Coal Slurry Treatment, Bureau of Mines Information Circular #7660, 209–171.